(12) United States Patent
Bomhoff et al.

(10) Patent No.: US 7,281,070 B2
(45) Date of Patent: Oct. 9, 2007

(54) MULTIPLE MASTER INTER INTEGRATED CIRCUIT BUS SYSTEM

(75) Inventors: Matthew D. Bomhoff, Tucson, AZ (US); Brian J. Cagno, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 11/045,682

(22) Filed: Jan. 28, 2005

(65) Prior Publication Data

US 2006/0174044 A1     Aug. 3, 2006

(51) Int. Cl.
G06F 12/00 (2006.01)
G06F 11/00 (2006.01)
H04J 3/24 (2006.01)
G06F 15/16 (2006.01)

(52) U.S. Cl. ............... 710/110; 709/223; 713/310; 713/323; 713/340; 710/104; 370/475; 714/38

(58) Field of Classification Search ........ 709/208–211; 710/110; 713/300–340
See application file for complete search history.

(56) References Cited

U.S. PATENT DOCUMENTS

| | | | | |
|---|---|---|---|---|
| 4,484,273 A * | 11/1984 | Stiffler et al. | ............... | 710/110 |
| 5,129,080 A * | 7/1992 | Smith | ............................ | 714/4 |
| 5,544,077 A * | 8/1996 | Hershey | ....................... | 702/58 |
| 5,951,661 A * | 9/1999 | Tavallaei et al. | ............ | 710/105 |
| 6,389,496 B1 * | 5/2002 | Matsuda | ..................... | 710/316 |
| 6,396,169 B1 * | 5/2002 | Voegeli et al. | ................. | 307/52 |
| 6,449,289 B1 * | 9/2002 | Quicksall | ..................... | 370/475 |
| 6,453,423 B1 * | 9/2002 | Loison | ........................ | 713/310 |
| 6,574,740 B1 * | 6/2003 | Odaohhara et al. | ......... | 713/323 |
| 6,622,265 B1 * | 9/2003 | Gavin | .......................... | 714/38 |
| 6,636,915 B1 * | 10/2003 | Dabby et al. | ............... | 710/240 |
| 6,715,013 B1 * | 3/2004 | Touchet | ...................... | 710/104 |
| 6,754,240 B1 * | 6/2004 | Crummey et al. | .......... | 370/537 |
| 6,915,441 B2 * | 7/2005 | Maciorwski et al. | ...... | 713/340 |
| 6,970,961 B1 * | 11/2005 | Heitkamp et al. | .......... | 710/110 |
| 7,020,076 B1 * | 3/2006 | Alkalai et al. | .............. | 370/217 |
| 7,039,734 B2 * | 5/2006 | Sun et al. | .................... | 710/110 |
| 7,082,488 B2 * | 7/2006 | Larson et al. | ............... | 710/301 |

(Continued)

OTHER PUBLICATIONS

"The I2C-Bus Specification Version 2.1"—Jan. 2000.*

*Primary Examiner*—Paul R. Myers
*Assistant Examiner*—Brian Misiura
(74) *Attorney, Agent, or Firm*—Quarles & Brady LLP

(57) ABSTRACT

A multiple-master Inter Integrated Circuit ("I2C") bus system includes a first master device including a first processing device within a first power boundary and a second master device including a second processing device within a second power boundary connected through a single I2C bus to one or more slave devices. The second master device utilizes a software algorithm or hardware component to detect or manage power up of the first power boundary. Additionally, the second master device includes a bus control algorithm that allows it, once initiated, to communicate with the connected slave device, to direct the first power boundary to activate or detect that the first power boundary has powered up, and to release the I2C bus. Once the first processor has initialized, the first master device acquires control of the I2C bus without arbitration or interference with the second master device.

12 Claims, 3 Drawing Sheets

U.S. PATENT DOCUMENTS

| | | | |
|---|---|---|---|
| 7,117,283 B2* | 10/2006 | Trembley | 710/110 |
| 7,162,279 B2* | 1/2007 | Gupta | 455/574 |
| 2003/0131281 A1* | 7/2003 | Jung et al. | 714/13 |
| 2004/0252966 A1* | 12/2004 | Holloway et al. | 386/46 |
| 2005/0125521 A1* | 6/2005 | Grimm et al. | 709/223 |
| 2005/0198419 A1* | 9/2005 | Noda | 710/110 |
| 2006/0020733 A1* | 1/2006 | Sarda | 710/305 |
| 2006/0179184 A1* | 8/2006 | Fields et al. | 710/36 |

\* cited by examiner

MULTIPLE MASTER INTER INTEGRATED CIRCUIT BUS SYSTEM

BACKGROUND OF THE INVENTION

1. Field of the Invention

This invention is related in general to the field of computer communication systems. In particular, the invention consists of a system for utilizing two master controllers on a single Inter Integrated Circuit Bus.

2. Description of the Prior Art

In modern electronic systems there are a number of peripheral integrated circuits ("IC") that have to communicate with each other and other external devices. One approach to simplifying circuitry is to use a simple bi-directional two-wire serial data bus referred to as an Inter Integrated Circuit ("I2C") bus. Each device on the I2C bus is recognized by a unique address and can operate as either a receiver or transmitter of information. Additionally, these devices operate in either a master or slave mode, depending on whether the device must initiate communication with other devices or is simply communicated with.

In a single master device I2C system, the master device need not negotiate control of the I2C bus with other master devices. However, in a traditional dual master device I2C system, extensive driver code is required to allow each master device to work smoothly with each other. This code must provide arbitration of the single I2C bus and collision avoidance and handling. Accordingly, it is desirable to have a multi-master I2C system that does not require extensive code for arbitrating the bus.

SUMMARY OF THE INVENTION

The invention disclosed herein utilizes multiple master devices residing within discrete power boundaries to prevent conflict between the various master devices. The power boundaries are managed so that a first master device never knows that the second master device exists, thus eliminating the need for extensive arbitration driver code.

A first master device resides within a first boundary and a second master device resides within a second power boundary. Each master device is connected to a common Inter Integrated Circuit ("I2C") bus which is, in turn, connected to one or more slave devices. According to this invention, slave devices will only communicate with one master device at a time. The slave device may reside within yet another power boundary or may be included as a member of both the first and second power boundaries. Either way, slave devices must be powered when either the first master device or the second master device are powered.

Initially, the second power boundary is activated, allowing the second master device to power on and boot. Once initialized, the second master device can communicate with any slave devices on the I2C bus. During this period, the second master may acquire device information from the slave devices, communicate with the slave devices, or control their behavior. Because the first power boundary has not been activated, the first master device is inactive and does not interfere with the activities of the second master device. Accordingly, no complicated driver software is needed for the second master device to arbitrate the I2C bus with the first master device.

When the first power boundary is activated, allowing the first master device to boot, the second master device detects this activation and relinquishes all mastering of the I2C bus. At this point, the first master device completes its initialization and assumes control of the I2C bus. Meanwhile, the second master device ignores the I2C bus. Accordingly, the first master device does not require complicated driver software to arbitrate the I2C bus with the second master device.

An optional embodiment of the invention includes adapting the second master device to continue to monitor the first power boundary. If the first power boundary becomes inactive, then the first master device must also be inactive and therefore does not need access to the I2C bus. In this scenario, the second master device may be adapted to resume control of the I2C bus until the first power boundary is again activated.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a multiple-master Inter Integrated Circuit ("I2C") bus. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
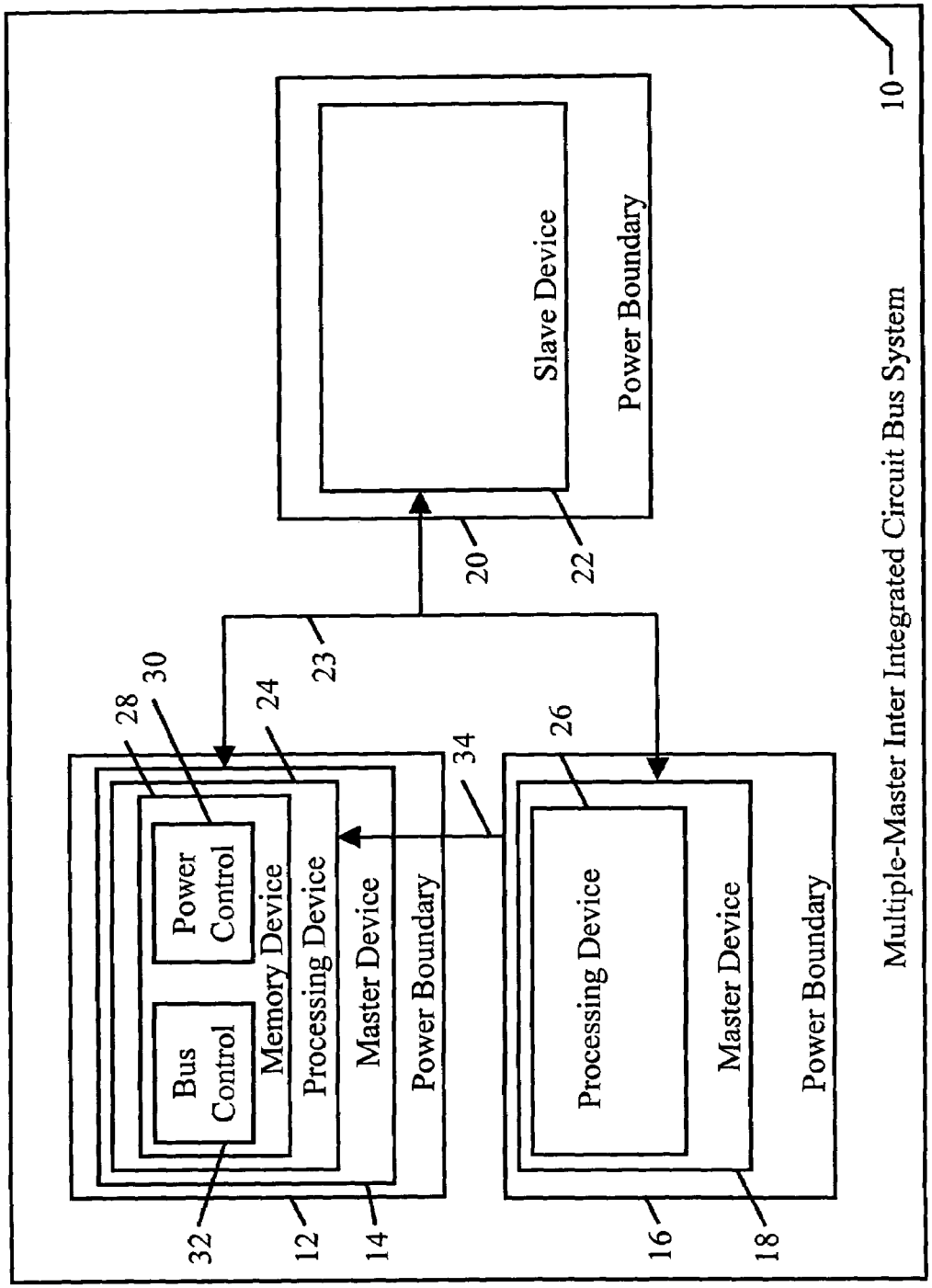
FIG. 1 is a block diagram illustrating a multiple-master Inter Integrated Circuit ("I2C") communication bus according to the invention.

Referring to figures, wherein like parts are designated with the same reference numerals and symbols, FIG. 1 is a block diagram illustrating a multiple-master Inter Integrated Circuit ("I2C") bus system 10 including a first power boundary 16 having a first master device 18, a second power boundary 12 having a second master device 14, and a third power boundary 20 having one or more slave devices 22 connected by an Inter Integrated Circuit bus. As previously indicated, the slave devices 22 may reside within their own power boundaries or may reside within the union of the first and second power boundaries. Either way, the slave devices 22 must be powered when either the first master device or the second master device is powered.

In this embodiment of the invention, the first master device 18 and second master device 14 include computer processors 24,26 and transceivers that allow them to utilize the I2C bus 23. The second power boundary is standby power and the first power boundary is the main power for the multiple-master I2C bus system 10. Additionally, the second master device 14 includes a memory device 28, such as an embedded flash memory, that maintains code for controlling the power boundaries as well as for managing the I2C bus. This code is embodied as a power control algorithm 30 and a bus control algorithm 32. Alternatively, the bus control algorithm 32 may incorporate instructions for controlling the power boundaries. Also, the memory device 28 may be an external memory device such as random-access memory ("RAM"), read-only memory ("ROM"), or a flash memory device.

Once power is applied to the multiple-master I2C bus system 10, the second processor 24 powers on and boots. In this embodiment of the invention, the first power boundary 16 is controlled by the second processor 24 and is, therefore, initially suppressed. Until the first power boundary 16 is activated, the second master device 14 is free to communicate with any connected slave devices 22 without interference from the first master device 18. In this embodiment of the invention, the second master device 14 polls configuration data from any associated slave devices 22 and then activates the first power boundary 16. Additionally, prior to the first power boundary becoming activated, the second master device 14 may communicate with any of the slave devices 22 as necessary. If the first power boundary is not controlled by the second master device 14, the second master device 14 includes a power sense line 34 for detecting activation of the first power boundary 16.

Whether directed by the second master device 14 or not, when the first power boundary is activated, the second master device releases control of the I2C bus 23 and ignores any further activity on the bus. The second processor 24 may enter standby or hibernation mode. Or, the second processor 24 may continue to be active performing tasks that do not require mastering of the I2C bus 23, i.e. behave as a slave device. Meanwhile, the first processor 26 powers on and boots, allowing the first master device 18 to gain control of the I2C bus 23.

Figure 2:
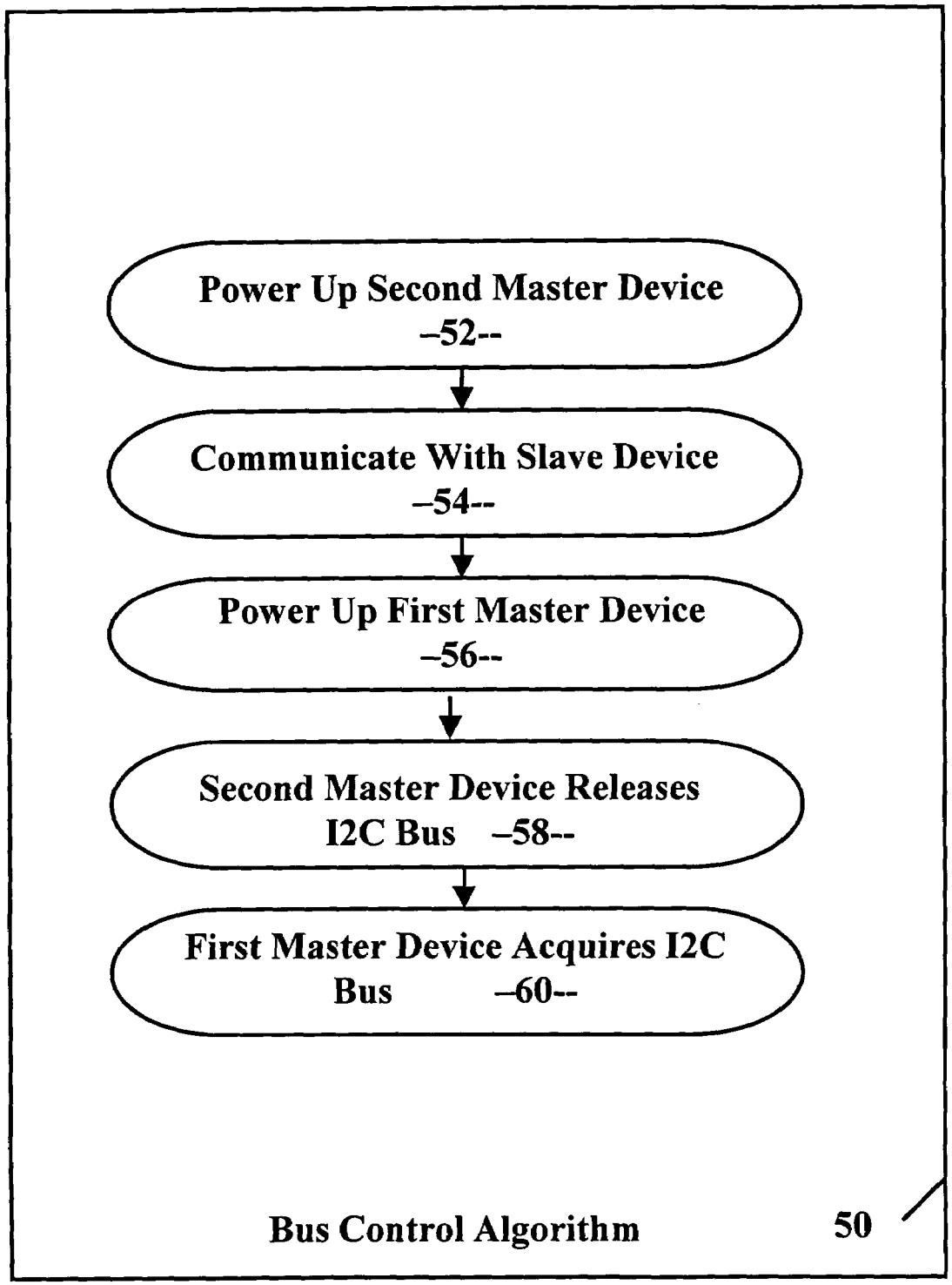
FIG. 2 is a flow chart illustrating a multiple-master I2C control algorithm according to the invention.

A bus control algorithm 50, according to the invention, is illustrated by the flowchart of FIG. 2. In step 52, the second master device 14 powers on and boots. Once initialized, the second master device communicates with associated slave devices 22 over the I2C bus in step 54. In optional step 56, the second processor 24 activates the first power boundary 16 allowing the first processor 26 to power on and boot. In step 58, the second processor 24 detects that the first power boundary 16 is active and releases control of the I2C bus. Once the first processor 26 has initialized, the first processor acquires control of the I2C bus 23 and communicates with its associated slave devices in step 60.

Figure 3:
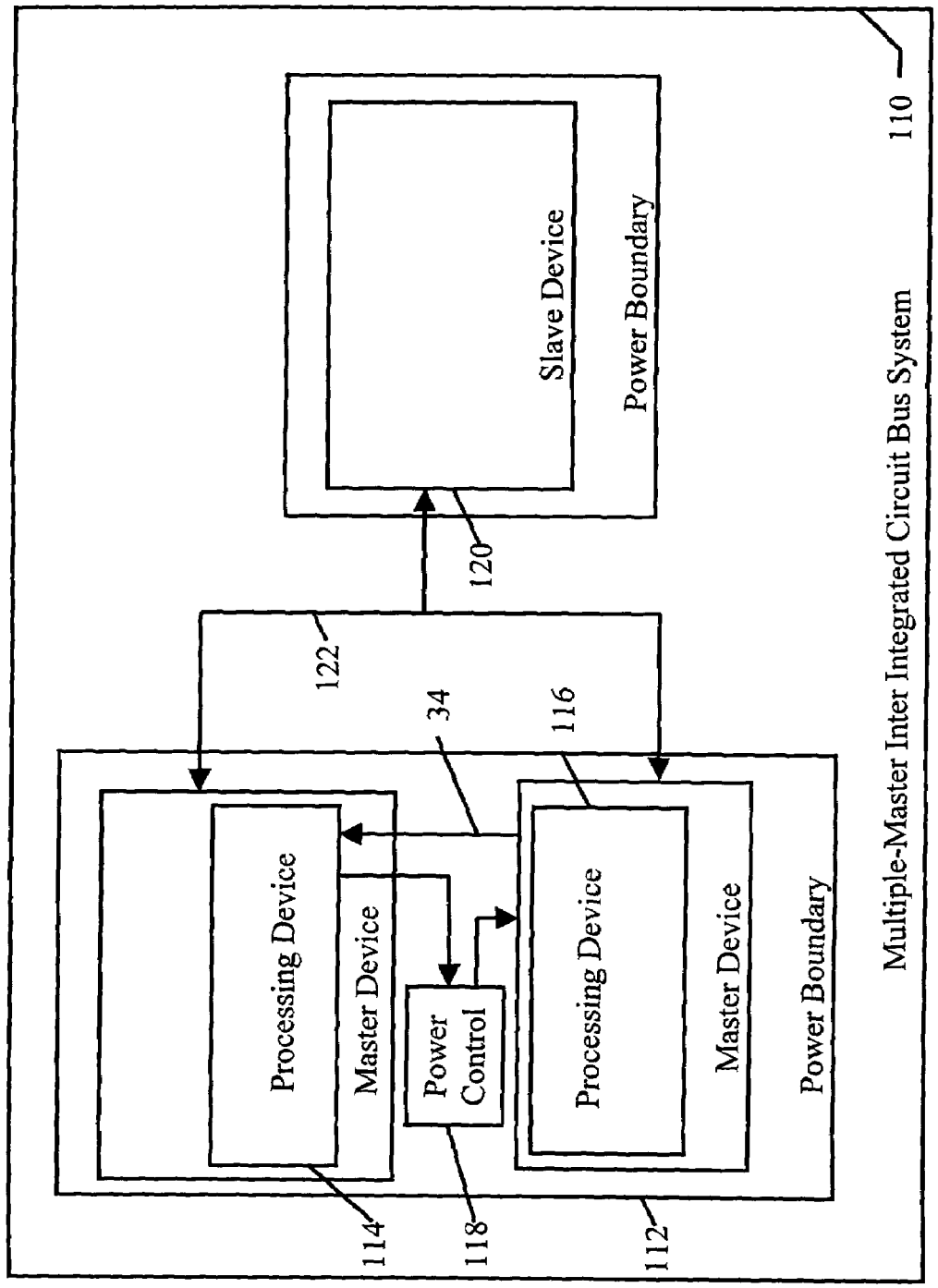
FIG. 3 is a block diagram of an alternate embodiment of the multiple-master Inter Integrated Circuit communication bus according to the invention.

An alternate embodiment of the invention is illustrated in FIG. 3. A multiple-master Inter Integrated Circuit bus system 110 includes a first power boundary 112 that includes a first processor 114, a second processor 116, and a power controller 118. In this embodiment of the invention, the power control algorithm is implemented using hardware components including the power controller 118. The power controller 118 may include components for switching power to and from the first and second processors 114,116 as well as a timer to allow the first processor sufficient time to boot and acquire information from slave devices 120 over the I2C bus 122.

Those skilled in the art of making computer communication systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A multiple-master Inter Integrated Circuit ("I2C") bus system, comprising:
   one or more slave devices electrically connected to an I2C bus;
   a first master device electrically connected to the I2C bus and residing within a first power boundary; and
   a second master device electrically connected to the I2C bus and residing within a second power boundary, said second master device including a processing device adapted to control the first power boundary of the first master device, detect when the first master device has powered-on and to discontinue the second master device's use of the I2C bus, and further includes a memory device adapted for holding a bus power control algorithm, the bus power control algorithm directing the first master device to power on, wherein:
   the first power boundary is initially suppressed by the processing device,
   the second master device polls configuration data from any of the slave devices, and
   subsequent to polling configuration data, the second master device activates the first power boundary to power on the first master device.

2. The multiple-master I2C bus system of claim 1, wherein the second master device includes a power controller.

3. A method of managing a multiple-master Inter Integrated Circuit ("I2C") bus, comprising the steps of:
   powering on a second master device electrically connected to a slave device through an I2C bus and residing within a second power boundary;
   suppressing a first power boundary which controls a first master device;
   polling configuration data from the slave device;
   subsequent to polling the configuration data, directing the second master device to power on a first master device electrically connected to the slave device through the I2C bus through activation of the first power boundary;
   directing the second master device to discontinue communication over the I2C bus; and
   allowing the first master device to control the I2C bus.

4. The method of claim 3, wherein the second master device includes a processing device.

5. The method of claim 4, wherein the second master device includes a memory device.

6. The method of claim 4, wherein the second master device includes a power control device adapted to power on the first master device.

7. An article of manufacture including a data storage medium, said data storage medium including a set of machine-readable instructions that are executable by a processing device to implement an algorithm, said algorithm comprising the steps of:
   powering on a second master device electrically connected to a slave device through an I2C bus and residing within a second power boundary;

suppressing a first power boundary which controls a first master device;

polling configuration data from the slave device;

subsequent to polling the configuration data, directing the second master device to power on a first master device electrically connected to the slave device through the I2C bus through activation of the first power boundary;

directing the second master device to discontinue communication over the I2C bus; and allowing the first master device to control the I2C bus.

8. The article of manufacture of claim 7, wherein the second master device includes a processing device.

9. The article of manufacture of claim 7, wherein the second master device includes a power control device adapted to power on the first master device.

10. The multiple-master I2C bus system of claim 2, wherein the power controller further includes a timer to allow for sufficient boot time and to acquire information from the slave device.

11. The method of claim 6, wherein the power control device further includes a timer to allow for sufficient boot time and to acquire information from the slave device.

12. The article of manufacture of claim 9, wherein the power control device further includes a timer to allow for sufficient boot time and to acquire information from the slave device.

* * * * *